(12) United States Patent
Okuyama

(10) Patent No.: US 7,324,230 B2
(45) Date of Patent: Jan. 29, 2008

(54) IMAGE FORMING APPARATUS AND IMAGE FORMING METHOD FOR FORMING COLOR AND MONOCHROMATIC IMAGES

(75) Inventor: Hiroyuki Okuyama, Mishima (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 855 days.

(21) Appl. No.: 10/309,149

(22) Filed: Dec. 4, 2002

(65) Prior Publication Data

US 2004/0109202 A1 Jun. 10, 2004

(51) Int. Cl.
*G06F 15/00* (2006.01)
*G06K 1/00* (2006.01)

(52) U.S. Cl. ..................... 358/1.15; 358/1.18
(58) Field of Classification Search .............. 358/1.9, 358/2.1, 1.11–1.18, 1.1, 530, 518; 715/528; 382/300, 264, 304
See application file for complete search history.

(56) References Cited

U.S. PATENT DOCUMENTS

| 5,146,545 | A  | * | 9/1992 | Maruyama ................. 358/1.16 |
| 5,357,354 | A  | * | 10/1994 | Matsunawa et al. ........ 358/530 |
| 6,118,544 | A  | * | 9/2000 | Rao ......................... 358/1.18 |
| 6,559,958 | B2 | * | 5/2003 | Motamed et al. .......... 358/1.13 |
| 6,606,165 | B1 | * | 8/2003 | Barry et al. ................ 358/1.9 |

FOREIGN PATENT DOCUMENTS

JP 11-115254 4/1999

* cited by examiner

*Primary Examiner*—Gabriel Garcia
*Assistant Examiner*—Thierry L. Pham
(74) *Attorney, Agent, or Firm*—Foley & Lardner LLP

(57) ABSTRACT

An image forming apparatus includes a storage section which stores image data for each page, an identification information generating section which generates identification information for identifying the type of the image data for each page, an engine image processor section has a plurality of processor sections for processing the image data to form an image, and a selector section which selects and outputs image data corresponding to the identification information, out of the image data processed by means of the processor section. The apparatus further includes an engine section which forms the image in accordance with the outputted image data.

6 Claims, 6 Drawing Sheets

IMAGE FORMING APPARATUS AND IMAGE FORMING METHOD FOR FORMING COLOR AND MONOCHROMATIC IMAGES

BACKGROUND OF THE INVENTION

1. Field of the Invention

The present invention relates to an image forming apparatus, and more particularly, to an image forming apparatus capable of forming a color image in accordance with color image data and forming a monochromatic image in accordance with monochromatic image data.

2. Description of the Related Art

In a known image forming apparatus, such as a color multifunction machine, color images are formed in accordance with color image data, and monochromatic images in accordance with monochromatic image data.

In this color multifunction machine, a page memory is stored with image data obtained by processing image data on an original document read by means of a scanner section or image data transmitted from a computer apparatus such as a personal computer (PC) that is connected by way of an interface. Thereafter, in the color multifunction machine, the image data are subjected to image processing, such as gradation, smoothing, etc., by means of an image processor mounted in a print engine section for printing, and an image is formed and printed in accordance with the image data. The image processing of the image data by means of the image processor in the engine section is carried out in common without regard to the type of the image data transmitted from the page memory, color or monochromatic.

Thus, the image processor subjects the color image data and the monochromatic image data to image processing without discrimination, so that the color and monochromatic images cannot enjoy their proper image processing.

Accordingly, there is a need for an image forming apparatus that can process image data according to the type of the image data in order to print images by means of the print engine section.

BRIEF SUMMARY OF THE INVENTION

According to an aspect of the present invention, an image forming apparatus comprises a storage section which stores image data for each page, an identification information generating section which generates identification information for identifying the type of the image data for each page, an engine image processor section which has a plurality of processor sections which processes the image data to form an image, a selector section which selects and outputs image data corresponding to the identification information, out of the image data processed by means of the processors, and an engine section which forms the image in accordance with the image data selected and outputted by means of the selector.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Figure 1:
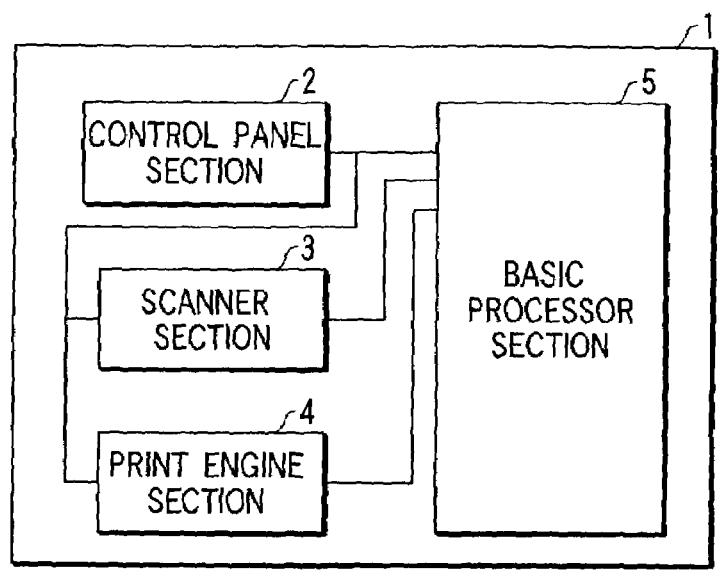
FIG. 1 is a diagram schematically showing an image forming apparatus according to an embodiment of the invention.
Figure 4:
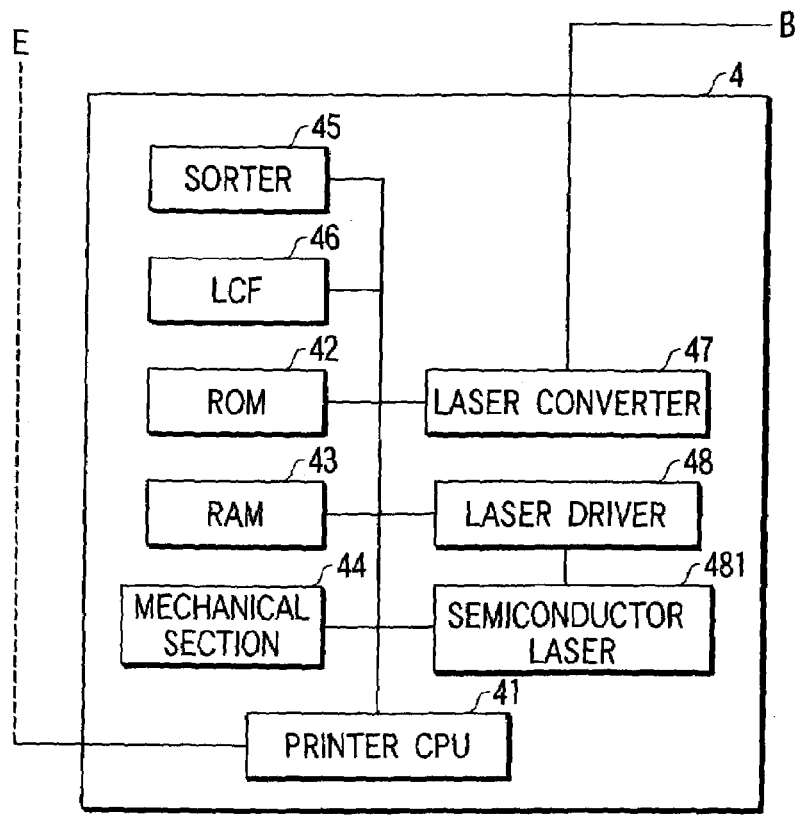
FIG. 4 is a diagram showing a control block of a print engine section of the same embodiment.
Figure 2:
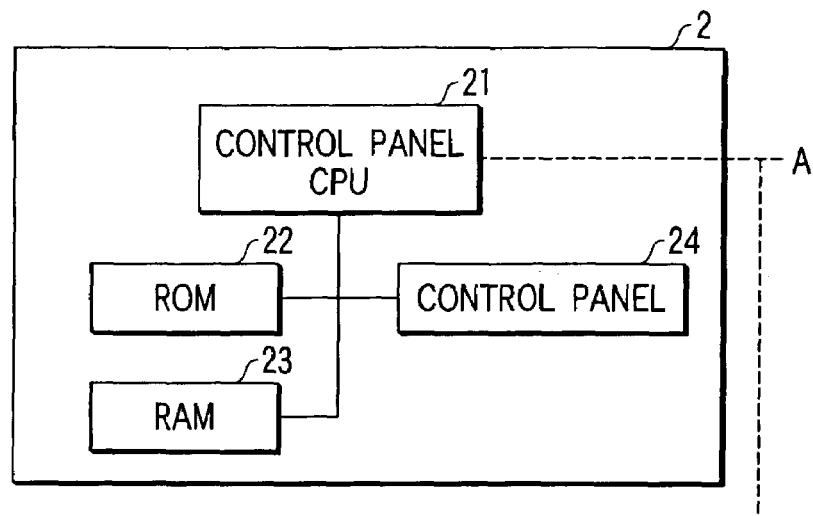
FIG. 2 is a block diagram showing a control configuration of a control panel section of the same embodiment.
Figure 3:
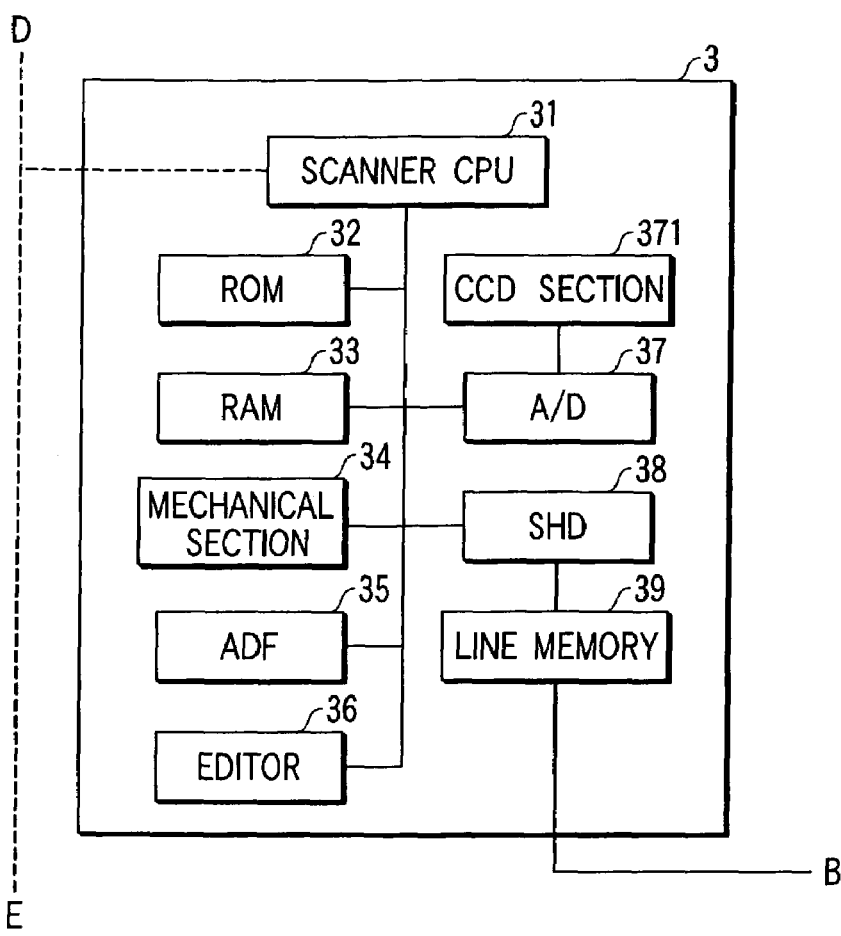
FIG. 3 is a diagram showing a control block of scanner section of the same embodiment.
Figure 5:
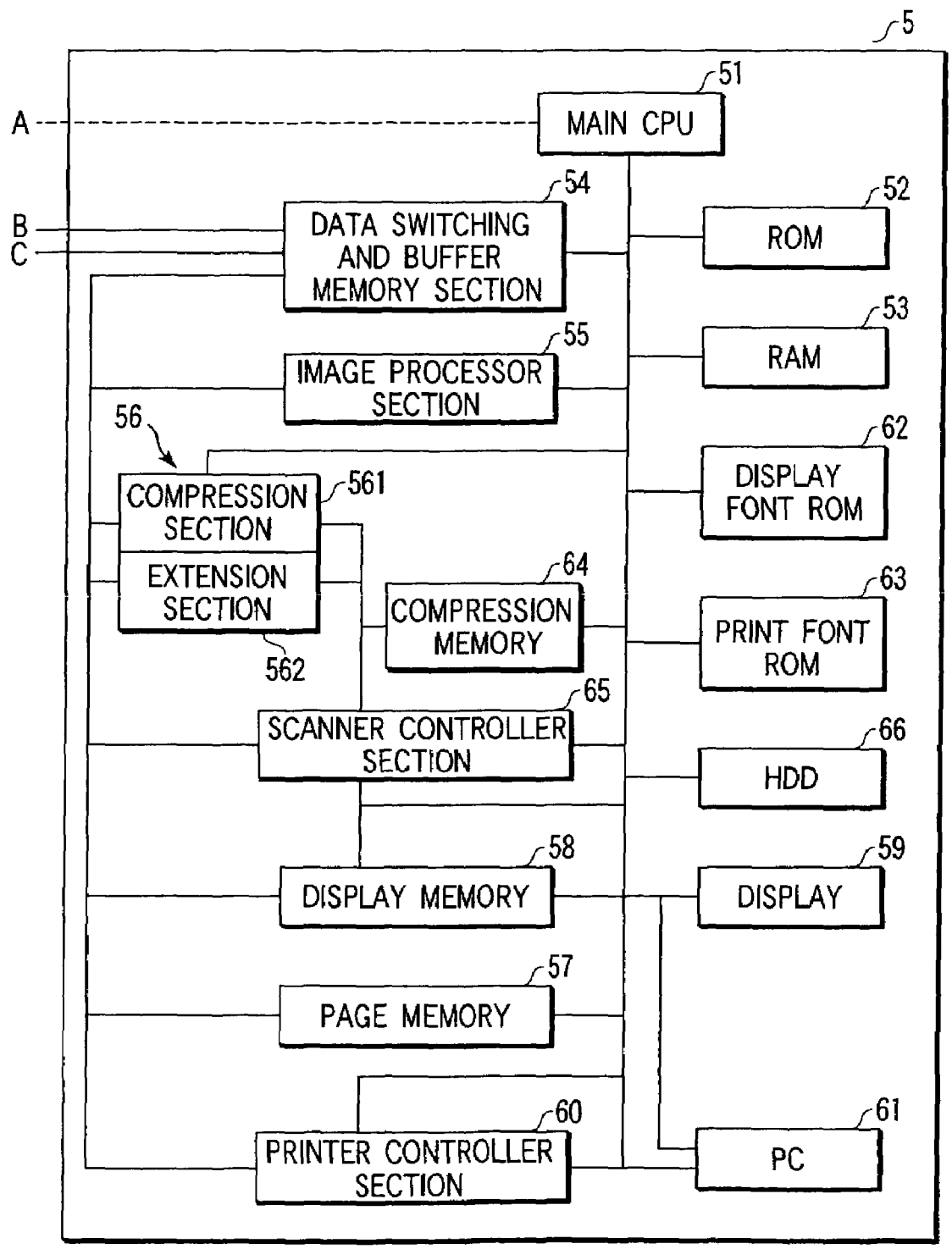
FIG. 5 is a diagram showing a control block of a basic processor of the same embodiment.

An embodiment of the present invention will now be described with reference to the drawings. The following is a description of the case where the present invention is applied to a multifunction peripheral (MFP) 1 as a color multifunction machine. The MFP 1 shown in FIG. 1 comprises a control panel section 2, scanner section 3, print engine section 4, and basic processor 5.

FIGS. 2 to 5 are views showing control blocks of the MFP 1. In the MFP 1, a control panel CPU 21, scanner CPU 31, printer CPU 41, and main CPU 51 controls the control panel section 2, scanner section 3, print engine section 4, and basic processor 5, respectively. Further, the main CPU 51 communicates with the control panel CPU 21, scanner CPU 31, and printer CPU 41 and controls them.

The control panel CPU 21 is connected to a ROM 22 and a RAM 23. Based on data stored in the ROM 22 and the RAM 23, the control panel CPU 21 carries out detection of switches on a control panel 24, on-off operation for LED's, control of indicators, etc.

Based on data stored in a ROM 32 and a RAM 33, the scanner CPU 31 carries out control of a mechanical section 34, including a motor, solenoid, etc. (not shown), and control of an automatic document feeder (ADF) 35, coordinate input unit (editor) 36, analog-to-digital converter (A/D) 37, shading correction circuit (SHD) 38, line memory 29, etc. Further, a CCD section 371 is connected to the A/D 37. The CCD section 371 is designed to read images by means of a monochromatic CCD sensor and a color CCD sensor, for example.

Based on data stored in a ROM 42 and a RAM 43, the printer CPU 41 carries out control of a mechanical section 44, including a motor, solenoid, etc. (not shown), and control of a sorter 45, large cassette feeder (LCF) 46, laser converter 47, laser driver 48 for controlling a semiconductor laser 481, etc.

The main CPU 51 comprehensively controls the MFP 1 in accordance with control programs that are stored in a ROM 52 and a RAM 53.

A data switching and buffer memory section 54 effects switching as to where data scanned by scanner section 3 is to be sent, and which data is to be sent to the print engine section 4. An image processor section 55 will be described in detail later. In a compression/extension section 56, a compression section 561 compresses image data, while an extension section 562 extends image data. A page memory (storage section) 57 can store image data for each page. A display memory 58 is loaded with image data to be displayed on a display 59. A printer controller section 60 develops code data from a personal computer (PC) 61 into image data. A display font ROM 62 develops the code data on the display memory 58. A print font ROM 63 develops the code data on the page memory 57. A compression memory 64 stores data that are compressed by means of the compression section 561 of the compression/extension section 56.

The main CPU 51 is further connected to a drive, e.g., a hard disc drive (HDD) 66, through a scanner controller section 65.

Figure 6:
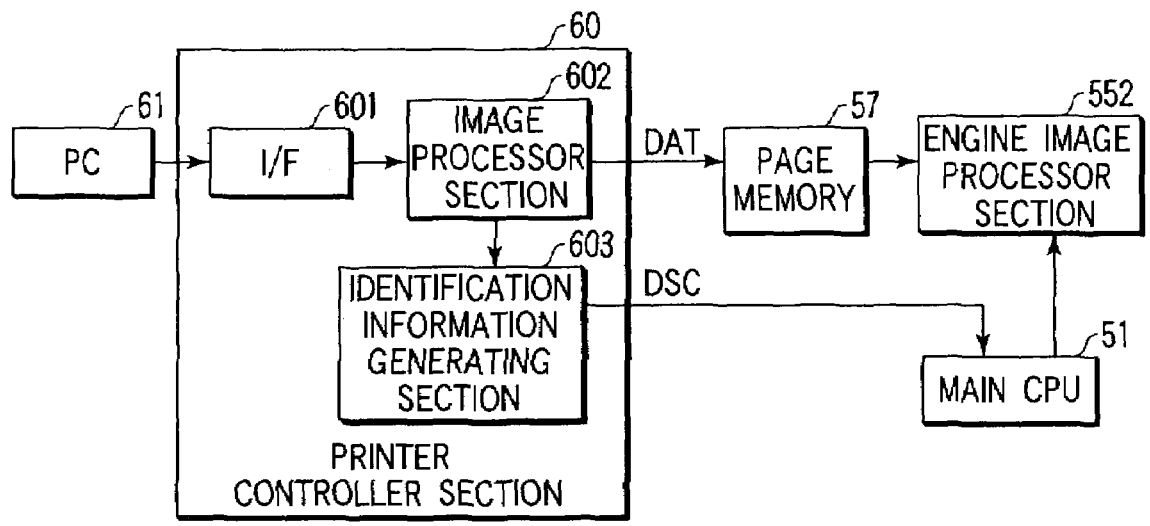
FIG. 6 is a diagram showing an outline of an image processor section of the same embodiment.

The configuration of the printer controller section 60 will now be described with reference to FIG. 6. The printer controller section 60 is composed of an interface (I/F) 601, image processor section 602, and identification information generating section 603. The I/F 601 is used to receive image data from a PC that is connected by way of a network, for example. The image processor section 602 carries out image processing for the image data inputted through the I/F 601. The image-processed data are delivered bit by bit to the page memory 57. The identification information generating section 603 discriminates between color image data and monochromatic image data from color information tags of the image data inputted through the I/F 601, and generates a DSC signal for the identification of the image data. The DSC signal is delivered as identification information to the main CPU 51.

Figure 7:
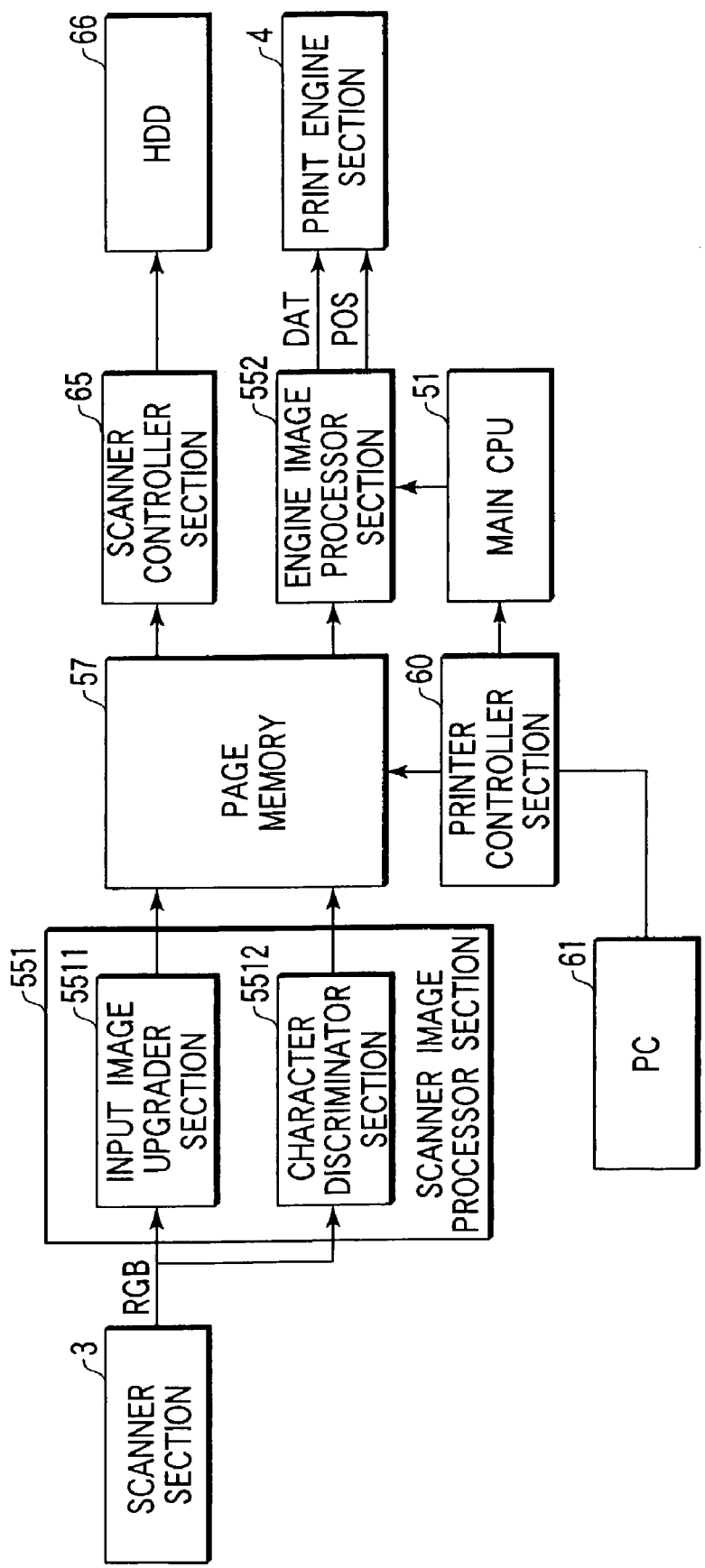
FIG. 7 is a diagram showing a configuration of an MFP of the same embodiment.

The image processor section 55 will now be described with reference to FIG. 7. FIG. 7 is a diagram for illustrating the flow of image data processing of the MFP. The image processor section 55 is composed of a scanner image processor section 551, an engine image processor section 552, etc., and carries out processing with the aid of the page memory 57 and the like.

The scanner image processor section 551 is composed of an image upgrader section 5511 and a character discriminator section 5512. The scanner image processor section 551 processes the image data read from the scanner section 3 and delivers the processed image data to the page memory 57. Alternatively, the data can be outputted through the compression section 56 (not shown in this drawing) and the page memory 57. In the image upgrader section 5511, the image data are subjected to processing for upgrading the image data, such as color changing and filtering. In the character discriminator section 5512, the image data is subjected to processing for discriminating characters from the image data.

Figure 8:
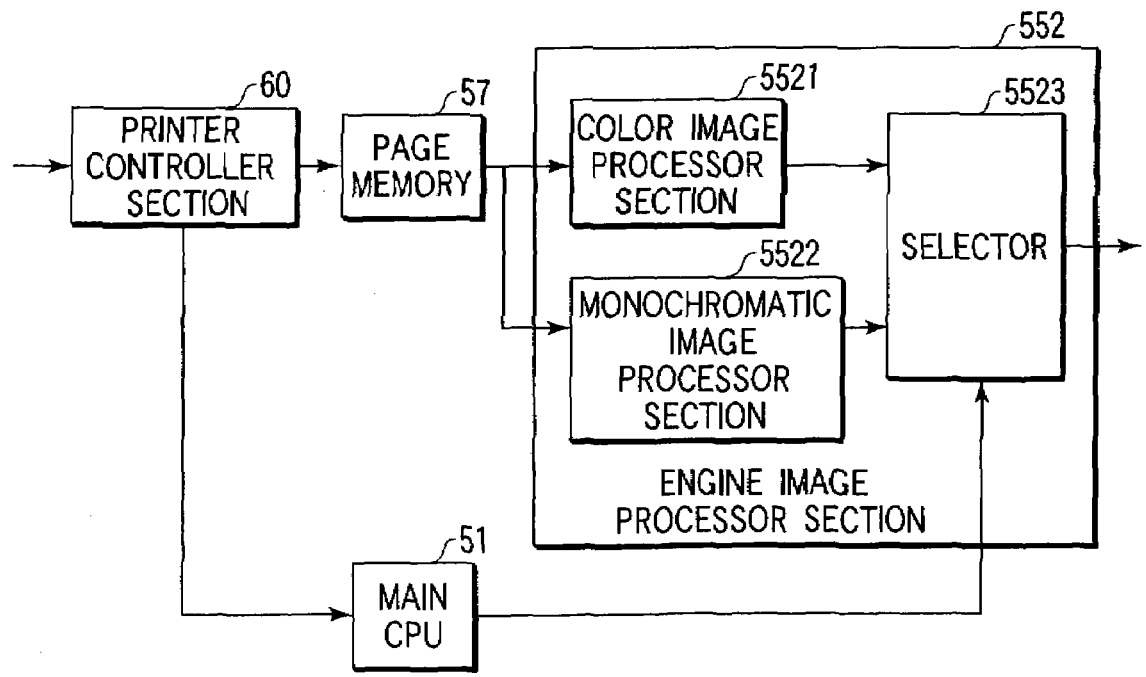
FIG. 8 is a diagram showing a configuration of an engine image processor section.

As shown in FIG. 8, the engine image processor section 552 is provided with a color image processor section 5521 for color image processing, a monochromatic image processor section 5522 for monochromatic image processing, and a selector 5523 as a selector section. The image processor section 55 is composed of a circuit, which can carry out image processing at high speed.

The image data outputted bit by bit from the printer controller section 60 are applied bit by bit to the color image processor section 5521 and the monochromatic image processor section 5522 in parallel relation through the page memory 57. The image data are processed into image data that can be used to form images in the print engine section 4.

In image processing of a conventional MFP or the like for processing color and monochromatic images, image data are processed by 8 bits. This is done because the MFP is configured so that the color and monochromatic image data can be processed by only changing parameters of one image processor and that a 8-bit image data processing that is suited for color image data. Although this 8-bit image data processing is suited for large data such as color image data, handling the large data requires an increase in capacity of the page memory, thus entailing higher cost. If the image data are processed by 8 bits, moreover, processing monochromatic image data is retarded.

As in this embodiment, the image data are processed bit by bit to match monochromatic image data processing. In monochromatic image data processing, therefore, the image data can be processed at high speed. Since the image data are processed bit by bit, moreover, the quantity of data to be handled in the page memory 57 is small. Thus, the capacity of the page memory 57 can be reduced, so that the cost can be lowered.

The color image processor section 5521 subjects the image data to smoothing for color image data, for example, while the monochromatic image processor section 5522 subjects the image data to smoothing for monochromatic image data, for example. Thus, in the engine image processor section 552, image processing proper to each of the color and monochromatic image data can be carried out by means of either of the processor sections.

In the process for smoothing the monochromatic image data, a near pattern is grasped by an efficient method of profile tracing and extraction, for example, and a smoothing signal is generated by simple computation of profile information. By doing this, smoothing with less jaggy can be carried out corresponding to every original image pattern.

In the process for smoothing the color data, first color image data saved in the page memory 57, for example, is converted into second color image data for one page, corresponding to recording agents of four colors, magenta, cyan, yellow, and black, for example. In the aforesaid process, moreover, edge portions of a formed image are smoothed in accordance with the second color image data, and a pixel growth system based on pulse width modulation is controlled. The pulse width is the pulse width of the pulse width modulation system that represents gradation by changing the driving pulse width of a laser diode (not shown) in accordance with the gradation level of image data, for example.

The image data processed in the color image processor section 5521 and the image data processed in the monochromatic image processor section 5522 are both applied to the input of the selector 5523. The selector 5523 is controlled by means of instructions given from the main CPU 51 in accordance with the DSC signal, and alternatively selects one of the processed image data as an output to the print engine section 4. If the main CPU 51 concludes that the DSC signal is a color image, for example, the engine image processor 552 outputs the image data processed in the color image processor section 5521.

The MFP 1 constructed in this manner has a copying function, scanner function, printing function, etc., for example. The following is a description of the flow of image data processing for each function.

In the copying function, the image data read by means of the scanner section 3 are subjected to processing, such as upgrading, character discrimination, etc. Further, image data are subjected to image processing for copying, and an image signal (DAT) and a reference position signal (POS) are delivered to the print engine section 4. Based on these input signals, an image is formed in the print engine section 4.

In the scanner function, the image data read by means of the scanner section 3 are upgraded. The processed image data are delivered through the page memory 57 to the scanner controller section 65 to be converted thereby into electronic files, which are saved in the HDD 66.

In the printer function, image data delivered from the PC 61 or the like through a network or the like are subjected to image processing in the printer controller section 60. The image data are applied bit by bit to the engine image processor section 552 through the page memory 57. In the engine image processor section 552, as mentioned before, the color image data are subjected to smoothing for color image data, the monochromatic image data are subjected to smoothing for monochromatic image data, and the image signal (DAT) and the reference position signal (POS) are delivered to the print engine section 4. Based on these input signals, an image is formed in the print engine section 4.

The following is a description of an example of the flow of processing carried out in the image processor section 55, for the case where the image data are received from the PC 61 to form an image.

Figure 9:
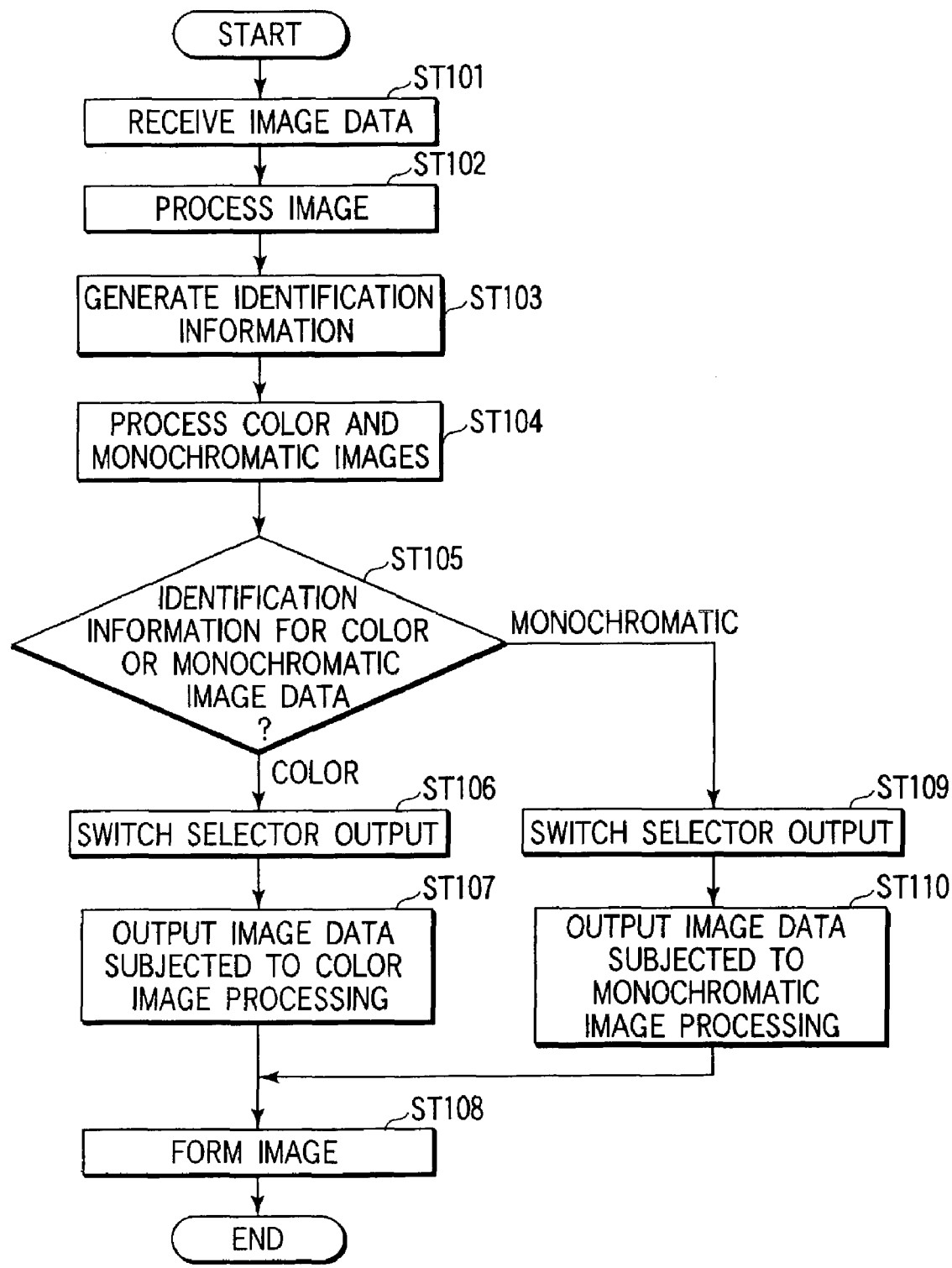
FIG. 9 is a flowchart showing an example of image formation of the same embodiment.

When the image data are received from the PC 61 in Step ST101, as shown in FIG. 9, the image data are subjected to image processing in the image processor section 602 of the printer controller section 60 in Step ST102. In Step ST103, the identification information generating section 603 generates a DSC signal from the color information tags of the received image data and delivers it to the main CPU 51.

In Step ST104, the image data processed in the image processor section 602 are applied bit by bit to the color image processor section 5521 and the monochromatic image processor section 5522 in parallel relation through the page memory 57. Thus, the inputted image data are subjected to monochromatic image processing and color image processing in parallel relation in the processor sections 5521 and 5522, individually.

In Step ST105, the main CPU 51 determines by the DSC signal whether the image data for the page concerned are color image data or monochromatic image data.

If the main CPU 51 concludes in Step ST105 that the image data are color image data, the processing advances to Step ST106. In Step ST106, the selector 5523 is switched so as to deliver the color image data to the print engine section 4 under the control of the main CPU 51. Then, in Step ST107, the color image data are delivered from the selector 5523 to the print engine section 4. Based on the inputted image data, the print engine section 4 forms an image in Step ST108.

If the main CPU 51 concludes in Step ST105 that the image data are monochromatic image data, moreover, the processing advances to Step ST109. In Step ST109, the selector 5523 is switched so as to deliver the monochromatic image data to the print engine section 4 under the control of the main CPU 51. Then, in Step ST110, the monochromatic image data are delivered from the selector 5523 to the print engine section 4. The processing then advances to Step ST108 mentioned before, whereupon the print engine section 4 forms an image.

Thus, in the MFP 1, the engine image processor section 552 is provided with the color image processor section 5521 for processing the color image data and the monochromatic image processor section 5522 for processing the monochromatic image data. When an image of a page is formed, the selector 5523 selects and outputs image data processed in accordance with identification information that is obtained from image data on the page. Accordingly, image data that are subjected to image processing adaptive to the color image data or monochromatic image data for each page can be delivered to the print engine section 4. Thus, the MFP 1 can reproduce optimum image qualities for color and monochromatic images on each page, thereby forming a high-quality image.

According to this one embodiment, the engine image processor section 552 is provided with the color image processor section 5521 and the monochromatic image processor section 5522 so that processing can be performed to match the color and monochromatic images. Alternatively, however, the engine image processor section 552 may be provided with a plurality of processor sections corresponding to processing such that high-quality images by the image data are subjected to proper processing depending on their types. In this case, the identification information generating section 603 can generate identification information according to the type, and the selector 5523 can select and deliver output image data in accordance with the identification information.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image forming apparatus comprising:
   a storage section which stores image data for each page;
   an identification information generating section which identifies whether the image data is color image data or monochromatic image data to generate identification information;
   a color image data processing section which receives the image data stored in the storage section, performs a specific color image processing for the input image data every page in spite of the input image data being the color image data or the monochromatic image data, performs a first smoothing operation on the color image data and outputs a first processed image data, wherein in said first smoothing operation, the color image data is converted into converted color image data for one page, corresponding to recording agents of four colors, magenta, cyan, yellow and black, edge portions of a formed image are smoothed in accordance with the converted color image data, and a pixel growth system is controlled based on pulse width of a pulse modulation;
   a monochromatic image data processing section which receives the image data stored in the storage section in parallel with the image being input to the color image data section, performs a specific monochromatic image processing for the input image data every page in spite of the input image data being the color image data or the monochromatic image data, performs a second smoothing operation on the monochromatic image data and outputs a second processed image data every page in parallel with an output of the first processed image data from the color image data processing section, wherein in said second smoothing operation, a near pattern of the monochromatic image data is grasped by a profile tracing and extraction and a smoothing signal is generated by simple computation of profile information;
   a selector section which selects and outputs the first processed image data in case that the image data stored in the storage section is identified as the color image data by the identification information generated by the identification information generating section, and selects and outputs the second processed image data in case that the image data stored in the storage section is identified as the monochromatic image data by the identification information generated by the identification information generating section; and an engine section which forms the image in accordance with the first processed image data or second processed image data selected and outputted by the selector section.

2. The image forming apparatus according to claim 1, wherein the color image data processing section processes the color image data bit by bit, and the monochromatic image data processing section processes the monochromatic image data bit by bit.

3. An image forming method comprising:

storing image data for each page;

generating identification information to identify whether the image data is color image data or monochromatic image data;

performing a specific color image processing for the image data every page in spite of the image data being the color image data or the monochromatic image data and performing a first smoothing operation on the color image data to output a first processed image data, wherein in said first smoothing operation, the color image data is converted into converted color image data for one page, corresponding to recording agents of four colors, magenta, cyan, yellow and black, edge portions of a formed image are smoothed in accordance with the converted color image data, and a pixel growth system is controlled based on pulse width of a pulse modulation;

performing a specific monochromatic image processing for the input image data every page in spite of the input image data being the color image data or the monochromatic image data and performing a second smoothing operation on the monochromatic image data to output a second processed image data every page in parallel with an output of the first processed image data, wherein in said second smoothing operation, a near pattern of the monochromatic image data is grasped by a profile tracing and extraction and a smoothing signal is generated by simple computation of profile information;

selecting and outputting the first processed image data in case that the image data is identified as the color image data by the identification information;

selecting and outputting the second processed image data in case that the image data is identified as the monochromatic image data by the identification information; and forming the image in accordance with the selected and outputted first processed image data or second processed image data.

4. The method according to claim 3, wherein the color image data processing includes processing the color image data bit by bit, and the monochromatic image data processing includes processing the monochromatic image data bit by bit.

5. An image forming apparatus for receiving image data of an image from a personal computer and printing the image comprising:

an interface which receives the image data from the personal computer to output the image data;

an image processor section which carries out image processing for the image data from the interface to output an image-processed data bit by bit;

a storage section which stores image-processed data for each page;

an identification information generating section which identifies from color information tags of the image data inputted through the interface whether the image-processed data is color image data or monochromatic image data to generate identification information;

a color image data processing section which receives the image-processed data stored in the storage section, performs a specific color image processing for the input image-processed data every page in spite of the input image-processed data being the color image data or the monochromatic image data, and outputs a first processed image data;

a monochromatic image data processing section which receives the image-processed data stored in the storage section in parallel with the image being input to the color image data section, performs a specific monochromatic image processing for the input image-processed data every page irrespective as to whether the input image-processed data is the color image data or the monochromatic image data, and outputs a second processed image data every page in parallel with an output of the first processed image data from the color image data processing section;

a selector section which selects and outputs the first processed image data in case that the image-processed data stored in the storage section is identified as the color image data by the identification information generated by the identification information generating section, and selects and outputs the second processed image data in case that the image-processed data stored in the storage section is identified as the monochromatic image data by the identification information generated by the identification information generating section; and an engine section which forms the image in accordance with the first processed image data or second processed image data selected and outputted by the selector section, wherein the color image data processing section performs a smoothing operation on the color image data and in said smoothing operation, the color image data is converted into converted color image data for one page, corresponding to recording agents of four colors, magenta, cyan, yellow and black, edge portions of a formed image are smoothed in accordance with the converted color image data, and a pixel growth system is controlled based on pulse width of a pulse modulation, wherein the monochromatic image data processing section performs a smoothing operation on the monochromatic image data and in said smoothing operation, a near pattern of the monochromatic image data is grasped by a profile tracing and extraction and a smoothing signal is generated by simple computation of profile information.

6. A method for receiving image data of an image from a personal computer and printing the image comprising:

receiving the image data from the personal computer to output the image data;

carrying out image processing for the image data to output an image-processed data bit by bit;

storing image-processed data for each page;

generating identification information to identify from color information tags of the image data inputted through the interface whether the image-processed data is color image data or monochromatic image data;

performing a specific color image processing for the image-processed data every page in spite of the image-processed data being the color image data or the monochromatic image data to output a first processed image data;

performing a specific monochromatic image processing for the input image-processed data every page irrespective as to whether the input image-processed data is the color image data or the monochromatic image data to output a second processed image data every page in parallel with an output of the first processed image data;

selecting and outputting the first processed image data in case that the image-processed data is identified as the color image data by the identification information; selecting and outputting the second processed image data in case that the image-processed data is identified as the monochromatic image data by the identification information;

forming the image in accordance with the selected and outputted first processed image data or second processed image data, performing a first smoothing operation on the color image data, wherein in said first smoothing operation, the color image data is converted into converted color image data for one page, corresponding to recording agents of four colors, magenta, cyan, yellow and black, edge portions of a formed image are smoothed in accordance with the converted color image data, a pixel growth system is controlled based on pulse width of a pulse modulation; and performing a second smoothing operation on the monochromatic image data, wherein in said second smoothing operation, a near pattern of the monochromatic image data is grasped by a profile tracing and extraction and a smoothing signal is generated by simple computation of profile information.

* * * * *